United States Patent

Amitrano et al.

Patent Number: 5,577,438
Date of Patent: Nov. 26, 1996

[54] GAS FIRED DEEP FAT FRYER

[75] Inventors: Roy A. Amitrano, Nashua; Mark E. McCabe, Ctr. Barnstead; George McMahon, Manchester; John T. Pottenger, New London; Steven J. Savage, Concord, all of N.H.

[73] Assignee: G. S. Blodgett Corporation, Burlington, Vt.

[21] Appl. No.: 626,318

[22] Filed: Apr. 2, 1996

[51] Int. Cl.⁶ .................................................. A47J 37/12
[52] U.S. Cl. .............. 99/403; 99/330; 126/375; 126/391
[58] Field of Search ............... 99/330, 403–408, 99/409–417; 126/391, 374–376, 41 R, 91 R, 373, 387, 390; 210/DIG. 8, 167, 232, 234; 426/417, 438; 431/326, 1, 329, 328

[56] References Cited

U.S. PATENT DOCUMENTS

| | | | |
|---|---|---|---|
| 2,176,869 | 7/1936 | Childs . | |
| 2,716,869 | 10/1939 | Childs | 126/391 |
| 4,091,801 | 5/1978 | Lazaridis et al. | 126/378 |
| 4,289,111 | 9/1981 | Duncan | 126/391 |
| 4,668,390 | 5/1987 | Hurley et al. | 210/167 |
| 4,751,915 | 6/1988 | Price | 99/403 X |
| 4,913,041 | 4/1990 | Taber et al. | 99/403 |
| 4,976,609 | 12/1990 | Grob et al. | 431/326 |
| 5,050,582 | 9/1991 | Almond et al. | 99/403 X |
| 5,209,218 | 5/1993 | Daneshvar et al. | 126/391 |
| 5,253,566 | 10/1993 | McCabe et al. | 99/330 X |
| 5,398,668 | 3/1995 | Daneshvar et al. | 126/391 |
| 5,402,713 | 4/1995 | King | 99/408 |
| 5,417,202 | 5/1995 | Cote | 99/403 X |

*Primary Examiner*—Timothy F. Simone
*Attorney, Agent, or Firm*—Donald C. Casey

[57] ABSTRACT

A gas fired deep fat fryer is described wherein in a first embodiment a single fry pot is used and in a second embodiment a split fry pot or a pair of matching fry pots are provided. In the first embodiment two immersion tubes are spaced apart and extend from the front toward the rear of the fry pot with a third pass immersion tube extending from the front through the rear into a flue. Combustion products travel the length of a burner tube through an immersion tube and return through a jet impingement baffle and then make a third pass from front to rear and into the flue. In the embodiment having split fry pot, a single burner and immersion tube therefor is provided with a separate third pass baffle tube. As in the first embodiment the products of combustion travel from the front toward the rear through an immersion tube and then pass downwardly and return the length of the tube from the rear to the front whereupon they encounter a header and pass into a third pass baffle tube extending the length of the fry pot from the front to the rear and into the flue, for exhaustion.

12 Claims, 5 Drawing Sheets

GAS FIRED DEEP FAT FRYER

CROSS REFERENCE TO RELATED APPLICATIONS

This application is related to a co-pending application entitled "Improved Frying Apparatus Filter System" filed on even date herewith, and assigned to the Assignee of this invention, and the disclosure thereof is hereby incorporated by reference.

DESCRIPTION OF THE PRIOR ART

In commercial restaurants and in fast-food type restaurants in particular deep fat fryers are used to prepare a variety of foods including meat, fish, poultry and potato products. Typically, the fryer includes a fry pot which is filled with an oil type liquid material maintained at a temperature sufficiently high to rapidly cook the foods. The foods to be cooked, are often batter coated, and frozen, and are placed in a mesh basket and lowered into the hot cooking oil.

As is well known, temperature control in such an environment is difficult. When the frozen food to be cooked is immersed in the hot cooking oil, it will initially lower the oil temperature very substantially.

It is desirable, for most food products, to return the cooking oil to its desired temperature as quickly as possible and to maintain it at that temperature during the cooking process, even though the cooking time for many of such food products is relatively short. Therefore, when a basket of food has been cooked, it will be desirable to replace it with uncooked food as quickly as possible to continue the cooking operation. In such situations then the energy requirement to maintain the cooking oil at the desired temperature can be substantial.

In gas fired deep fat fryers, typically the upper portion of the fry pot will be maintained at the temperature desired for cooking and a source of heat will be supplied below the upper portion. A relatively colder portion will be disposed therebelow. If burner tubes are used so that the products of combustion are circulated through the interior of the fry pot the heated oil will rise, and the area below the burner tubes will be colder than that above.

Furthermore, when cooking batter coated foods, as the food products encounter the turbulent hot cooking oil, pieces thereof will be dislodged and fall into the oil. It is necessary then to filter the oil on a regular basis so that the food particles therein can be removed before they affect the taste of the food being cooked in the cooking oil. An efficient filter system is disclosed in the above described, related patent application.

In order to optimize the energy requirements in a gas fired deep fat fryer, the prior art has attempted to provide energy saving designs. Typically the walls of the fry pot are heated, however, and the circulation of hot combustion gases from the burner through the walls is described in many different prior patents. As will be obvious to those skilled in the art, however, in attempting to utilize the heat content of combustion gases by circulating the same through the fry pot walls, both inner and outer walls will be heated. It is not desirable from a work environment standpoint to have the exterior surface of the fry pot any hotter than absolutely necessary. Furthermore, heat transferred to the outer wall will not heat the oil contained in the fry pot. Therefore, in for example U.S. Pat. No. 4,913,041, a split or double fry pot is provided with a central heating element, adjacent to cold zone below each of the fry pots.

In U.S. Pat. No. 4,751,915, the products of combustion are circulated through a central conduit and then circulated through the exterior walls in order to improve the efficiency of heating. This Patent does require insulation on the exterior walls in order to confine the heat to the interior of the fry pot.

In U.S. Pat. No. 2,176,869, there is described a triple pass system wherein combustion products from a burner circulate through a centrally located conduit from front to back of the fryer, a return through a conduit from back to front is disposed over the first conduit, and the combustion products are circulated a third time from front to back through a third conduit stacked on top of the first two, and from there into a flue. In the fry pot described therein, there is a central burner tube with stacked recirculating conduits, and a burner assembly disposed on each side of the tank with similar stacked conduits. This then is an attempt to extract the maximum amount of heat from the products of combustion. However, by stacking, the heat transfer area of the tubes is reduced.

There remains, then, a need for a highly efficient means for heating the cooking oil in a deep fat fryer whereby the maximum amount of heat generated by the burner is extracted from the combustion gases and used to heat the oil itself rather than the walls of the tank.

SUMMARY OF THE INVENTION

It has been discovered that in both single tank and split tank units, an inshot burner in a burner tube can be used to efficiently generate heat in a triple pass system. In the device of this invention, the inshot burner is disposed at the front of the tank firing into a burner tube which extends from the front wall toward the back wall of the tank. The burner tube has an open end portion and rests in a perforated, elongated metal jet impingement baffle.

The two are enclosed within a first immersion tube mounted on the front wall only. The tube extends toward the rear wall but does not abut the wall. The combustion gases then are directed from front to rear through the burner tube within the immersion tube, and recirculated downwardly from rear to front through the jet impingement baffle whereby the heat is extracted from combustion gases into the immersion tube walls, and by conduction therefrom into the oil bath surrounding the same. The heated oil then rises within the fry pot in convection currents. The returning combustion gases then encounter a header at the front of the tank which directs the combustion gases into a third pass baffle tube or a second immersion tube spaced away from the first and extending from the front to the rear of the tank. The outlet of the third pass baffle tube enters a flue, and typically an exhaust fan is provided to facilitate circulation of said gases upwardly through the flue. Both immersion tubes which contain on the one hand the burner tube and jet impingement baffle, and on the other hand the third pass baffle tube are immersed in the cooking oil and disposed below the hot section thereof and above the cold section. The triple pass circulation then has been found to provide a greatly enhanced cooker with highly efficient energy utilization.

Accordingly it is an object of this invention to provide a gas fired deep fat fryer which efficiently uses immersion tubes to extract heat from the products of combustion and to heat the oil therein.

It is another object of this invention to provide a triple pass system in a gas fired deep fat fryer wherein a pair of immersion tubes are provided with a first tube containing a burner and a return jet impingement baffle and the second tube containing a third pass baffle for conveying the gases from the first tube into a flue through the tank of oil to be heated.

It is a further object of this invention to provide a jet impingement baffle system within an immersion tube wherein hot exhaust gases enter the impingement tube and are forced therefrom against the sides of an immersion tube to heat the same which tube is immersed in the oil to be heated thereby.

It is yet another object of this invention to provide a split fryer assembly wherein a pair of deep fat fryers are provided having either a common inside wall or abutting inside walls wherein each fryer mounts a burner in an immersion tube extending from front to rear, and a return jet impingement baffle for returning the products of combustion from the rear to the front into a header which in turn circulates the same into a third pass baffle tube which extends through the oil tank to an outlet flue.

It is yet another object of this invention to provide a single tank deep fat fryer wherein a pair of burners are provided in mutually spaced immersion tubes extending from the front to the rear thereof, each tube containing a jet impingement baffle return tube for returning the products of combustion from rear to front and a header is provided wherein the returning products of combustion from both immersion tubes are combined in a single third pass immersion tube extending from front to rear through the central portion of the tank and exiting or opening into a flue with an exhaust fan for eliminating said combustion gases from the system.

These and other objects will become readily apparent with reference to the drawings and following description wherein:

BRIEF DESCRIPTION OF THE DRAWINGS

FIG. 4b is a side view of FIG. 4a.

FIG. 5b is a side view of FIG. 5a.

FIG. 12b is end view of the embodiment of FIG. 12a.

DETAILED DESCRIPTION OF THE PREFERRED EMBODIMENTS

Figure 1:
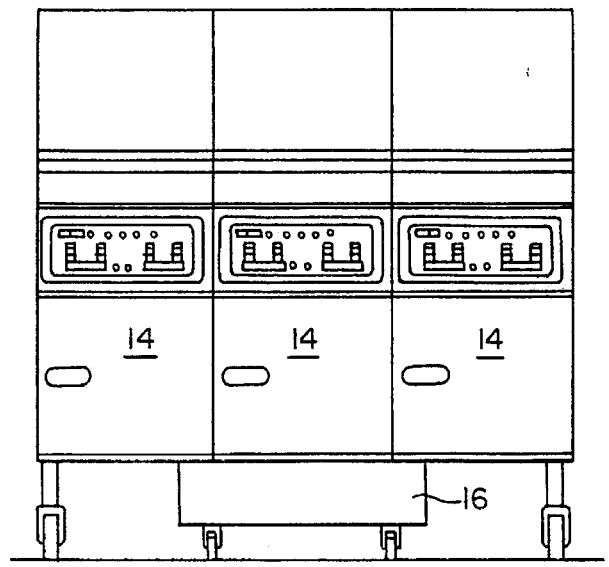
FIG. 1 is a front view of three of the assembled deep fat fryers of this invention.
Figure 2:
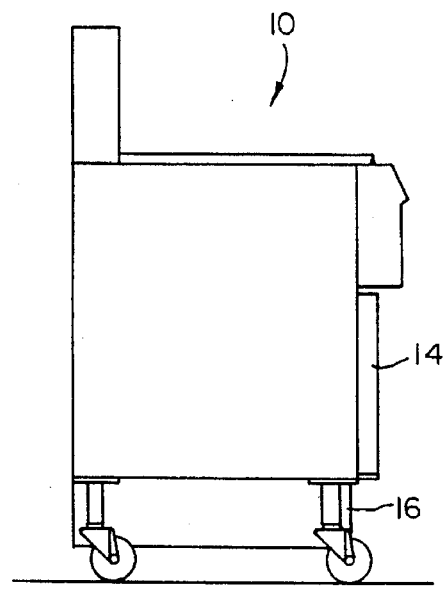
FIG. 2 is a side view of FIG. 1.
Figure 3:
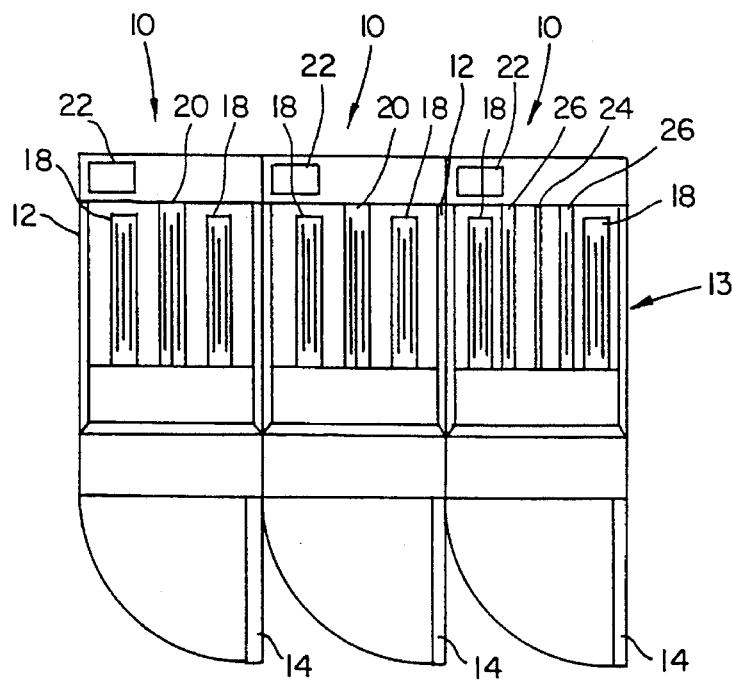
FIG. 3 is a top view of the fryers of FIG. 1 having access doors open.

With attention to the drawings and to FIGS. 1–3 in particular, there is shown a bank of three deep fat fryers 10 of this invention, each having a single fry pot 12, access doors 14 and, an oil filter pan assembly 16. A filter assembly preferably is that disclosed in the above identified related patent application and while a single such assembly can be used for the three fryers 10, as will be obvious to those skilled in the art, each fryer 10 could have its own filter assembly.

With attention to FIG. 3, fry pots 12 each use two burners and immersion tubes 18 and a single return third pass tube 20 which enters the flue 22 as will be subsequently described. In contrast, fry pot 13 is a split fry pot having central divider wall 24 which divides right and left fry pot sections. Each section has a burner tube 18, but individual return third pass baffle tubes 26 are provided as will be subsequently described. As shown in FIG. 1, typically the external appearance of the two embodiments of a single fry pot or a split fry pot is the same.

Figure 4B:
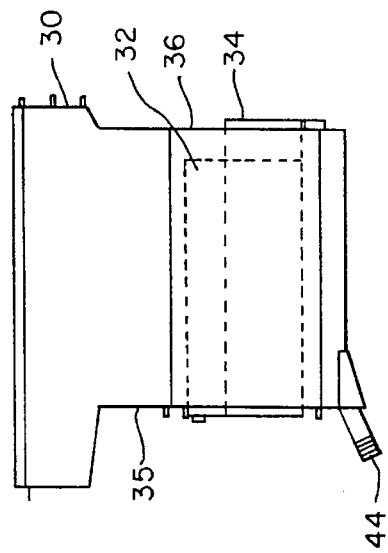
Figure 4A:
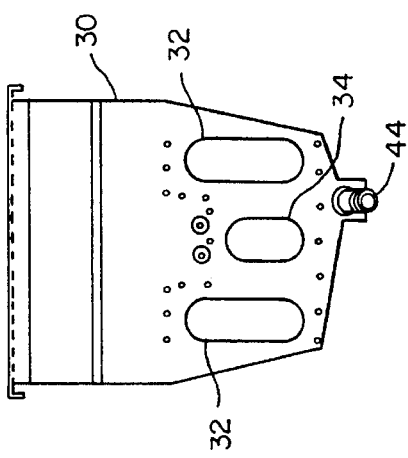
FIG. 4a is a front view of a single tank embodiment of the deep fat fryer fry pot of this invention.

With attention to FIGS. 4a and 4b, there is shown a single fry pot embodiment of this invention 30 having right and left immersion tubes 32 for burners and for the jet impingement baffle return and a third immersion tube 34 for the third pass. As shown in FIG. 4b, immersion burner tubes 32 are cantilevered from the front wall 35 of the fry pot 30 and do not touch the rear wall 36. In this way the tube 32 is free to expand or contract longitudinally as well as laterally with heat from the burner. The third pass tube 34 penetrates the back wall 36 and opens into a flue (not shown).

Figure 5B:
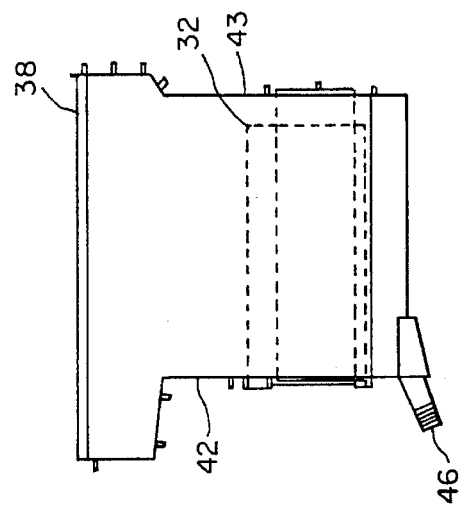
Figure 5A:
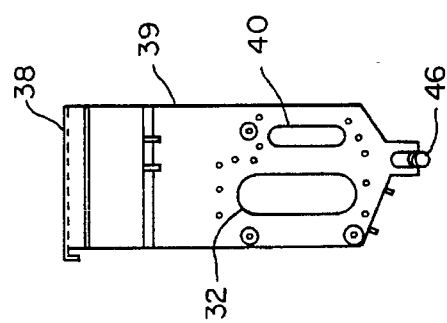
FIG. 5a is a front view of one half of a split tank fry pot of this invention.

With reference to FIGS. 5a and 5b, FIG. 5a shows the left hand half of a split fry pot 38. Fry pot 38 has an immersion tube 32 for receiving a burner and a jet impingement return baffle and immersion tube 32 is of similar design to that shown in FIGS. 4a and 4b. An inside wall 39 is provided which abuts typically the inside wall of a matching fry pot. A third pass immersion tube 40 is also provided. As in the case of the embodiments of FIGS. 4a and 4b, immersion tube 32 is cantilevered from the front wall 42 of the fry pot 38 but does not touch the rear wall 43. Third pass return immersion tube 40 penetrates the rear wall 43 and opens into a flue not shown. A drain conduit 44 is provided for the single fry pot 30 and a similar drain tube 46 is provided for the split fry pot 38.

Figure 6:
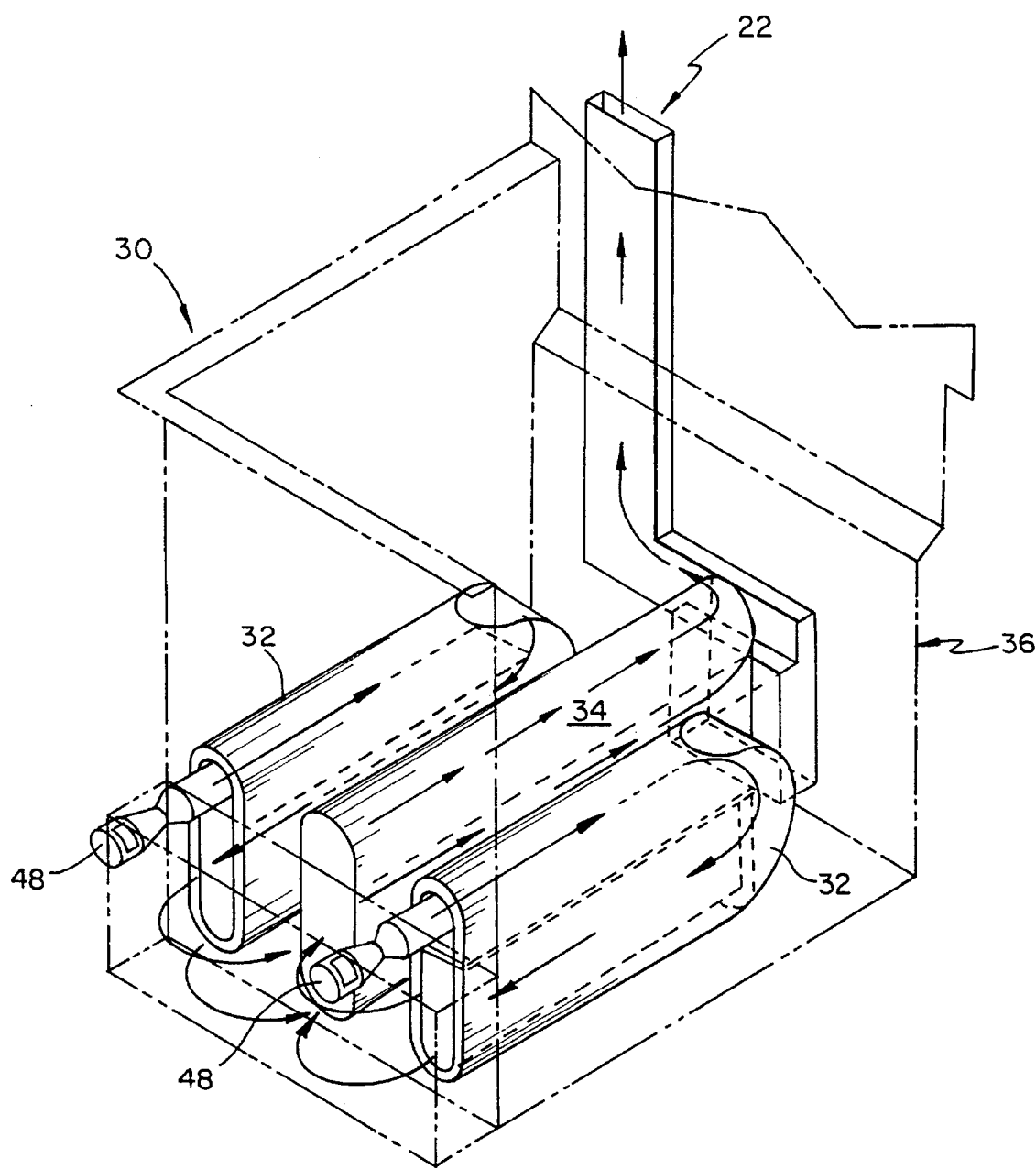
FIG. 6 is a schematic representation of the circulation of combustion gases through a deep fat fryer according to the embodiment of FIGS. 4a and 4b.
Figure 7:
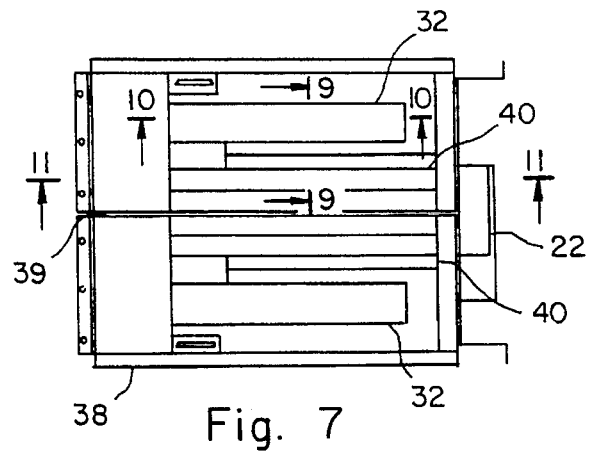
FIG. 7 is a top view of the split tank embodiment of FIGS. 5a and 5b.
Figure 9:
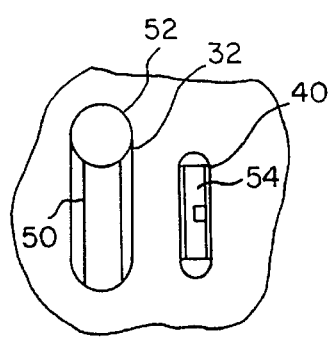
FIG. 9 is a fragmentary cross-sectional view taken along lines 9 9 of FIG. 7.
Figure 8:
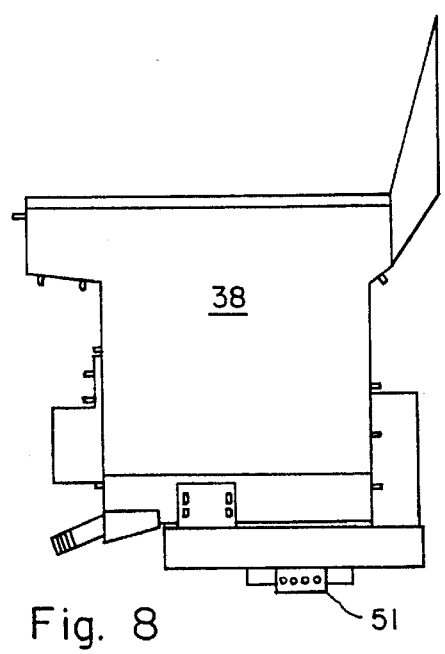
FIG. 8 is a partial side view of FIG. 7.
Figure 10:
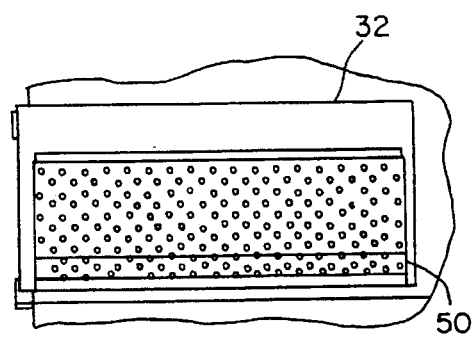
FIG. 10 is fragmentary cross-sectional view taken along lines 10 10 of FIG. 7.
Figure 11:
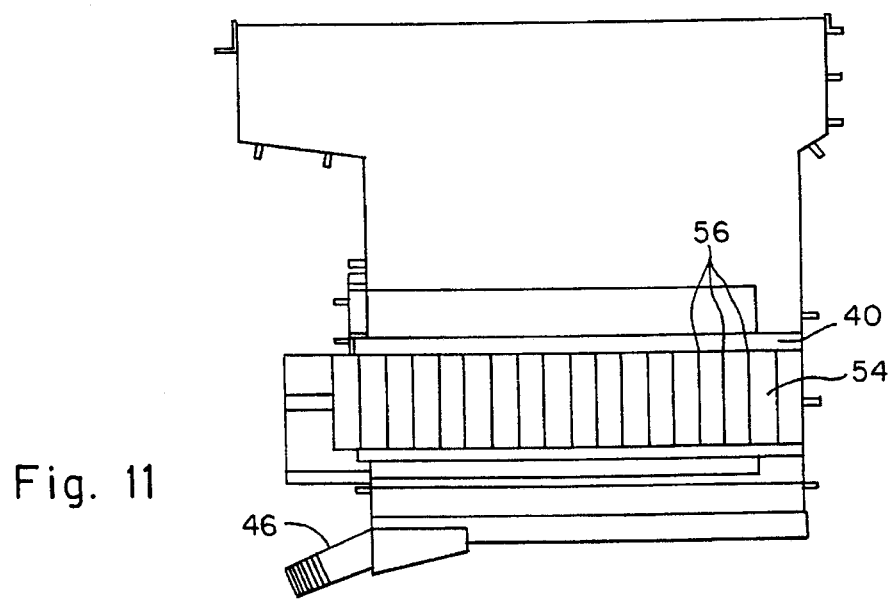
FIG. 11 is a side view in cross-section taken along lines 11 11 of FIG. 7.

With attention to FIG. 6, there is a schematic representation of the combustion gas flow in a single fry pot embodiment similar to FIGS. 4a and 4b. As shown therein burners 48 are provided in the upper portion of immersion tubes 32. The inshot burners 48 may be L-shaped if space requirements dictate, or may be coaxially mounted in front of the tube as shown.

The products of combustion then return through the lower portion of immersion tubes 32 and enter the third pass tube 34 which extends through the back wall 36 of the fry pot and enter a flue 22. Tube 34 contains a jet impingement baffle similar to baffle 50. A conventional exhaust fan is provided in flue 22 to assist in circulation. Immersion tubes 32 and 34, however, are submerged in the cooking oil during the cooking process in fry pot 30 to maximize the heat transfer from the surfaces of the immersion tubes 32 and 34 into the cooking oil.

With attention to FIGS. 7–11, in the split fry pot embodiment each fry pot 38, as described above, has an immersion tube 32 and a third pass return tube 40. Immersion tube 32 contains a jet impingement baffle 50 which occupies the lower portion thereof and a burner tube 52 disposed thereover. The return immersion tube 40 contains a baffle plate 54 which extends the length thereof. Baffle plate 54 is not a perforated tube as is the jet impingement baffle 50 but rather a series of approximately 90 degree bends in a relatively thin plate so that the combustion products circulate around the bends 56 as the gases pass the lengths of the tube 40 into the flue 22.

Figure 12A:
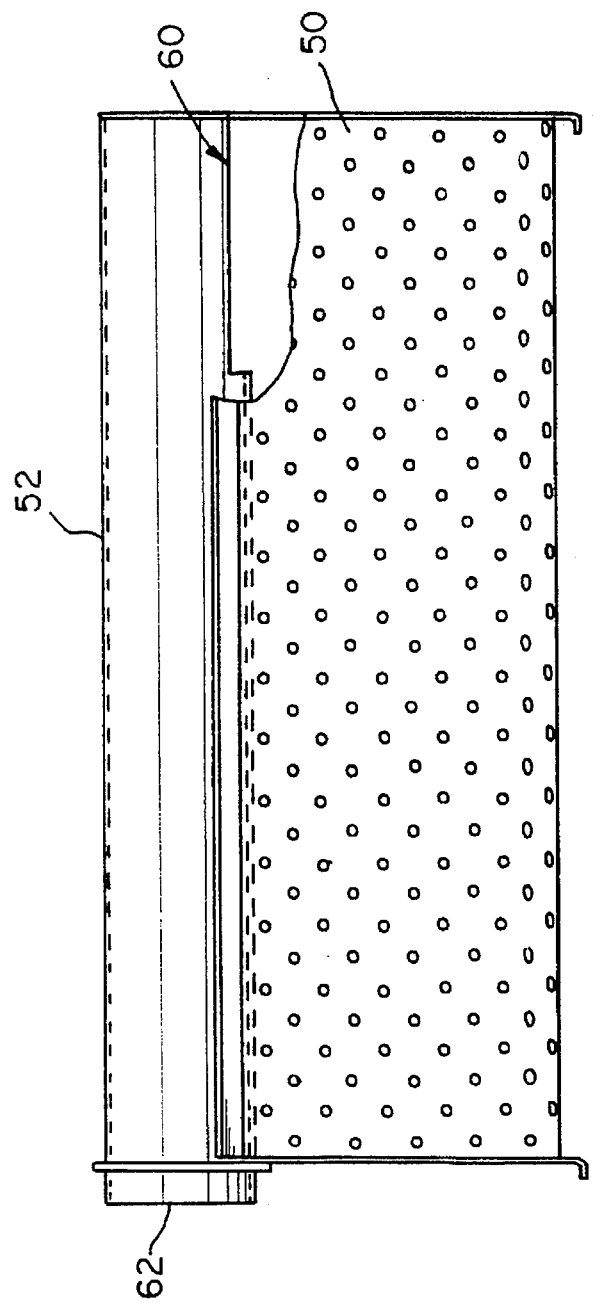
FIG. 12a is a side view of an immersion tube according to this invention containing a burner tube and a jet impingement tube for combustion gases wherein the outer wall of the immersion tube is removed.
Figure 12B:
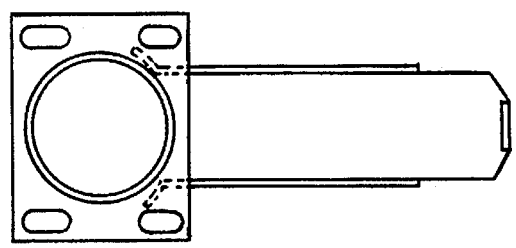

FIGS. 12a and 12b show the jet impingement tube 50 and the burner tube 52. As shown therein, burner tube 52 contains a vent 60. Combustion gases from the burner (not shown) which would be located at the front end 62 of the burner tube pass the length of the tube 52 and circulate downwardly through vent 60 into jet impingement baffle 50. The gases then return the length of the immersion tube 32 toward the front header under the influence of the exhaust fan 51 for recirculation through the third pass baffle tube 40 to the flue 22.

In summary then the triple pass system of this invention uses a minimum of two immersion tubes, one of which carries a third pass of combustion products from the front to the rear through the oil bath. Two burners are used in the single fry pot embodiment and a single burner is used in each of the split fry pots. In either instance, a burner tube is used to contain the inshot burner flame which is located at the front so that products of combustion travel the length of the burner tube through the immersion tube and through the oil bath from the front toward the rear. Adjacent the back or rear closed end, a vent is provided wherein a gases circulate downwardly to return from rear to front through the jet impingement baffle, through the header and into the third pass tube, under the influence of the exhaust fan. In this way, a triple pass is achieved for the combustion products so that the heat transfer therefrom can be maximized.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

We claim:

1. A triple-pass gas fired, deep fat fryer comprising:

a fry pot having front, rear and side walls an open top and a bottom;

at least one first immersion tube mounted on the inner surface of the front wall of said fry pot and extending therethrough toward the rear wall;

a burner tube mounted in the upper portion of said first immersion tube and extending the length said tube; an inshot burner is mounted at the end of said burner tube adjacent the front wall, said burner tube having a closed end opposite said burner and a downwardly opening vent adjacent thereto;

a jet impingement baffle tube disposed within said first immersion tube below said burner tube and extending the length thereof having an open outlet end at the front wall of said fry pot;

a second immersion tube extending from the front wall to the rear wall of said fry pot and baffle means disposed within said second tube; header means at the front wall of said fry pot for placing the outlet end of said jet impingement baffle tube in communication with end of said second tube adjacent the front wall of said fry pot; and flue means including fan means in communication with the end of said second immersion tube adjacent said rear wall for exhausting burner gases therefrom.

2. The deep fat fryer of claim 1 wherein a pair of first immersion tubes are provided adjacent opposite side walls of said fry pot each containing a burner, burner tube and jet impingement baffle tube and said header means is coupled between both of said first immersion tubes and said second immersion tube.

3. The fryer of claim 2 wherein said first immersion tubes lie in a common horizontal plane and said second immersion tube is mutually spaced therebetween.

4. The fryer of claim 1 wherein said jet impingement baffle is an elongated perforated tube.

5. The fryer of claim 4 wherein said jet impingement baffle receives the bottom portion of said burner tube along the upper surface thereof and defines a hemispherical groove therefor.

6. The fryer of claim 1 wherein said first immersion tube has a closed end adjacent but spaced away from the inner surface of the rear wall of said fry pot.

7. The fryer of claim 1 wherein said baffle means in said second immersion tube extends substantially the length thereof.

8. The fryer of claim 7 wherein said baffle means comprises a jet impingement baffle tube.

9. The fryer of claim 8 wherein said baffle tube is perforated.

10. The fryer of claim 1 wherein said baffle means comprises an elongated plate extending substantially the length of said second immersion tube, said plate defining mutually spaced, lateral bends along the length thereof.

11. The fryer of claim 10 wherein each bend is approximately 90 degrees and adjacent bends are in the opposite direction.

12. The fryer of claim 1 wherein a pair of fryers are provided having an abutting side wall and said flue means is common to both.

* * * * *